United States Patent
Lee

(10) Patent No.: US 9,863,113 B2
(45) Date of Patent: Jan. 9, 2018

(54) STEEL PIPE SOCKET AND METHOD OF CONNECTING STEEL PIPE PILE AND STEEL PIPE COLUMN USING THE SAME

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR)

(72) Inventor: Dae Yong Lee, Seoul (KR)

(73) Assignees: POSCO, Gyeongsangbuk-Do (KR); Research Institute of Industrial Science & Technology, Gyeongsangbuk-Do (KR)

( * ) Notice: Subject to any disclaimer, the term of this patent is extended or adjusted under 35 U.S.C. 154(b) by 437 days.

(21) Appl. No.: 14/369,573

(22) PCT Filed: Dec. 28, 2012

(86) PCT No.: PCT/KR2012/011668
§ 371 (c)(1),
(2) Date: Jun. 27, 2014

(87) PCT Pub. No.: WO2013/100678
PCT Pub. Date: Jul. 4, 2013

(65) Prior Publication Data
US 2014/0356058 A1   Dec. 4, 2014

(30) Foreign Application Priority Data

Dec. 28, 2011 (KR) .................... 10-2011-0144488

(51) Int. Cl.
*E02D 5/28* (2006.01)
*E02D 5/34* (2006.01)
*F16B 7/04* (2006.01)

(52) U.S. Cl.
CPC .............. *E02D 5/285* (2013.01); *E02D 5/34* (2013.01); *F16B 7/04* (2013.01); *Y10T 403/5706* (2015.01)

(58) Field of Classification Search
CPC ......... E02D 5/285; E02D 5/223; E02D 5/526; E02D 5/54; E02D 5/72; F16B 7/04;
(Continued)

(56) References Cited

U.S. PATENT DOCUMENTS

| 2,046,152 | A | * | 6/1936 | Dean | .................. | E04C 3/30 |
| | | | | | | 52/301 |
| 4,339,899 | A | * | 7/1982 | Klenk | ................ | E02D 27/42 |
| | | | | | | 403/337 |
| 6,857,808 | B1 | * | 2/2005 | Sugimoto | ............ | E04B 1/2403 |
| | | | | | | 248/903 |

FOREIGN PATENT DOCUMENTS

| CN | 1257143 A | 6/2000 |
| CN | 2403821 Y | 11/2000 |

(Continued)

OTHER PUBLICATIONS

EPO machine translation of JP2005-200879A. Machine Translation [online]. European Patent Office, 2017 [retrieved on Jan. 10, 2017]. Retrieved from the internet: <URL:https://worldwide.espacenet.com/publicationDetails/description?CC=JP&NR=2005200879A&KC=A&FT=D&ND=3&date=20050728&DB=&locale=en_EP>.*

(Continued)

*Primary Examiner* — Matthieu F Setliff
(74) *Attorney, Agent, or Firm* — Finnegan, Henderson, Farabow, Garrett & Dunner, LLP

(57) ABSTRACT

A steel pipe pile and a steel pipe column is connected using a steel pipe socket. The connection method may include preparing the steel pipe socket including a socket supporting portion that covers an upper end surface of the steel pipe (Continued)

pile, and inserting a plurality of socket insertion portions extended downward from the socket supporting portion and having a plurality of socket grooves at a lower end portion thereof and a plurality of fastening members installed on the socket supporting portion. The method may also include inserting the socket grooves of the steel pipe socket into an upper end portion of the steel pipe pile and mounting the steel pipe column on the socket supporting portion. The method may further include fastening the steel pipe column and the steel pipe pile using the plurality of fastening members of the socket supporting portion.

14 Claims, 8 Drawing Sheets

(58) Field of Classification Search
CPC ...... F16B 7/0406; F16B 7/0426; F16B 7/182; Y10T 403/5706; Y10T 403/57; Y10T 403/5793; Y10T 403/64; Y10T 403/642; Y10T 403/645; Y10T 403/76; Y10T 403/77; Y10T 403/551; Y10T 403/553; Y10T 403/66
See application file for complete search history.

(56) References Cited

FOREIGN PATENT DOCUMENTS

| | | |
|---|---|---|
| JP | 6-108701 | 4/1994 |
| JP | 6-60488 | 8/1994 |
| JP | 2005-200879 | 7/2005 |
| JP | 2008-45337 | 2/2008 |
| KR | 10-2009-0041707 | 4/2009 |
| KR | 10-0950666 | 4/2010 |
| KR | 10-2010-0086162 A | 7/2010 |
| KR | 10-0985823 | 10/2010 |
| KR | 10-2010-0130111 | 12/2010 |
| KR | 10-2011-0052091 | 5/2011 |
| KR | 10-1051914 | 7/2011 |

OTHER PUBLICATIONS

Search Report dated Mar. 23, 2015 in corresponding Chinese Patent Application No. 201280065272.9.
English-language International Search Report from the Korean Patent Office for International Application No. PCT/KR2012/011668, dated Apr. 26, 2013.

* cited by examiner

STEEL PIPE SOCKET AND METHOD OF CONNECTING STEEL PIPE PILE AND STEEL PIPE COLUMN USING THE SAME

TECHNICAL FIELD

The present invention relates to a steel pipe socket and a method of connecting a steel pipe pile and a steel pipe column using the same, and more particularly, to a steel pipe socket which connects the steel pipe pile and the steel pipe column, and a method of connecting a steel pipe pile and a steel pipe column using the same.

BACKGROUND ART

It is very difficult to perform work for directly installing a steel pipe column on an installed steel pipe pile. The reason is that eccentricity in a horizontal direction may occur due to an installation error at a position where the steel pipe pile or the steel pipe column is installed, and in a case in which a predetermined value of inclination occurs when the steel pipe pile is installed in a construction site, it is very difficult to ensure verticality of the steel pipe column that is mounted on the steel pipe pile.

In order to remove the eccentricity of the steel pipe pile or the steel pipe column and ensure verticality of the steel pipe column, a concrete bottom plate is mainly used when the steel pipe pile and the steel pipe column are connected in the related art.

According to a method of connecting the steel pipe pile and the steel pipe column using the concrete bottom plate in the related art, a required quantity of steel pipe piles are first installed at an installation position by driving the steel pipe piles, and then upper end surfaces of the steel pipe piles which are damaged during the pile driving are trimmed. In this case, work for attaching iron reinforcing bars on the upper end surfaces of the steel pipe piles may be added in order to improve attachment force among the upper end surfaces of the steel pipe piles and the concrete bottom plates. Further, the concrete bottom plate is completed by pouring concrete after arranging the iron reinforcing bars for a concrete bottom plate and installing forms. In this case, bottom plate bolts are installed in advance before pouring concrete in consideration of installation positions of the steel pipe columns. Further, lower end surfaces of the steel pipe columns are mounted on the concrete bottom plates, which are completely cured, and fixed on a floor using base plates and the bottom plate bolts. In this case, horizontality and verticality of the steel pipe column are ensured by forming a grout layer between the base plate and the concrete bottom plate.

The method of connecting the steel pipe pile and the steel pipe column using the concrete bottom plate in the related art is performed through processes of processing and assembling the iron reinforcing bars in accordance with constructing concrete foundations, installing the bottom plate bolts, installing the forms, pouring concrete, curing the concrete, installing grout, and the like, which cause a delay of a construction period and an increase in construction cost. Particularly, in the case of plant construction that has great characteristics of fast-track construction, a significantly long construction period is required to connect a steel pipe pile and a pipe rack steel pipe column, which results in a delay in terms of plant facility commissioning.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide an economical steel pipe socket capable of simplifying a process of connecting a steel pipe pile and a steel pipe column, and shortening a construction period, and a method of connecting the steel pipe pile and the steel pipe column using the steel pipe socket.

In addition, the present invention has been made in an effort to provide a steel pipe socket capable of removing eccentricity of a steel pipe pile or a steel pipe column, and ensuring verticality of the steel pipe column, and a method of connecting the steel pipe pile and the steel pipe column using the steel pipe socket.

Technical Solution

An exemplary embodiment of the present invention provides a steel pipe socket including: a socket supporting portion which covers an upper end surface of a steel pipe pile; a plurality of socket insertion portions which are extended downward from the socket supporting portion, and have a plurality of socket grooves at a lower end portion thereof so that the steel pipe pile is inserted into the plurality of socket grooves; and a plurality of fastening members which fasten a steel pipe column mounted on the socket supporting portion to the steel pipe pile, and are installed on the socket supporting portion.

The steel pipe socket may further include a horizontality maintaining member which is inserted into a gap between the socket insertion portion and a bottom of the socket groove, and that adjusts horizontality of the socket supporting portion.

The horizontality maintaining member may have a wedge shape.

The steel pipe socket may further include a reinforcing member which is installed on a lower surface of the socket supporting portion, and that reinforces strength of the socket supporting portion.

The steel pipe socket may further include a socket connecting portion which includes a column supporting portion that is installed on a lower end surface of the steel pipe column, and a plurality of reinforcing ribs which are simultaneously in contact with the column supporting portion and a side portion of the steel pipe column.

The column supporting portion may be in contact with an upper surface of the socket supporting portion.

The fastening members may be bolts and nuts that are disposed along an outer peripheral portion of the socket supporting portion, and the fastening members may be inserted into fastening holes of the column supporting portion.

A diameter of the socket supporting portion may be greater than a diameter of the steel pipe pile.

Another exemplary embodiment of the present invention provides a method of connecting a steel pipe pile and a steel pipe column using a steel pipe socket, including: forming an upper end surface of the steel pipe pile; inserting a plurality of socket insertion portions which are extended downward from a socket supporting portion of the steel pipe socket, and have a plurality of socket grooves; mounting the steel pipe column on the socket supporting portion; and fastening the steel pipe column and the steel pipe pile using a plurality of fastening members that are installed in the socket supporting portion.

The method may further include adjusting horizontality of the socket supporting portion by inserting a horizontality maintaining member into a gap between the socket insertion portion and a bottom of the socket groove.

The method may further include fixing the steel pipe socket to the steel pipe pile by welding the socket insertion portion and the socket groove.

The method may further include installing a socket connecting portion, which is connected with the steel pipe socket, on the steel pipe column.

The installing of the socket connecting portion may include: installing a column supporting portion on a lower end surface of the steel pipe column; and installing a plurality of reinforcing ribs which are simultaneously in contact with the column supporting portion and a side portion of the steel pipe column.

The fastening members may be inserted into fastening holes of the column supporting portion.

The method may further include forming an upper end surface of the steel pipe pile by horizontally cutting the upper end portion of the steel pipe pile prior to the forming of the plurality of socket grooves in the upper end surface of the steel pipe pile.

Advantageous Effects

According to the steel pipe socket according to the exemplary embodiment of the present invention and the method of the steel pipe pile and the steel pipe column using the same, by installing the steel pipe socket including the socket supporting portion which covers the upper end surface of the steel pipe pile, the plurality of socket insertion portions which are extended downward from the socket supporting portion and have the plurality of socket grooves at the lower end portion thereof so that the steel pipe pile is inserted into the plurality of socket grooves, and the plurality of fastening members which fasten the steel pipe column mounted on the socket supporting portion to the steel pipe pile and are installed on the socket supporting portion, it is possible to simply perform work for connecting the steel pipe pile and the steel pipe column without pouring concrete to form a concrete bottom plate.

Therefore, it is possible to shorten a construction period that is required to connect the steel pipe pile and the steel pipe column in the construction site.

In addition, it is not necessary to construct the concrete bottom plate, thereby reducing required construction costs.

Further, by installing the horizontality maintaining member which is inserted into the gap between the steel pipe pile and the bottom of the socket groove of the socket insertion portion and that adjusts horizontality of the socket supporting portion, it is possible to remove eccentricity in a horizontal direction of the steel pipe pile or the steel pipe column, and ensure verticality of the steel pipe column mounted on the steel pipe pile.

BEST MODE

Figure 1:
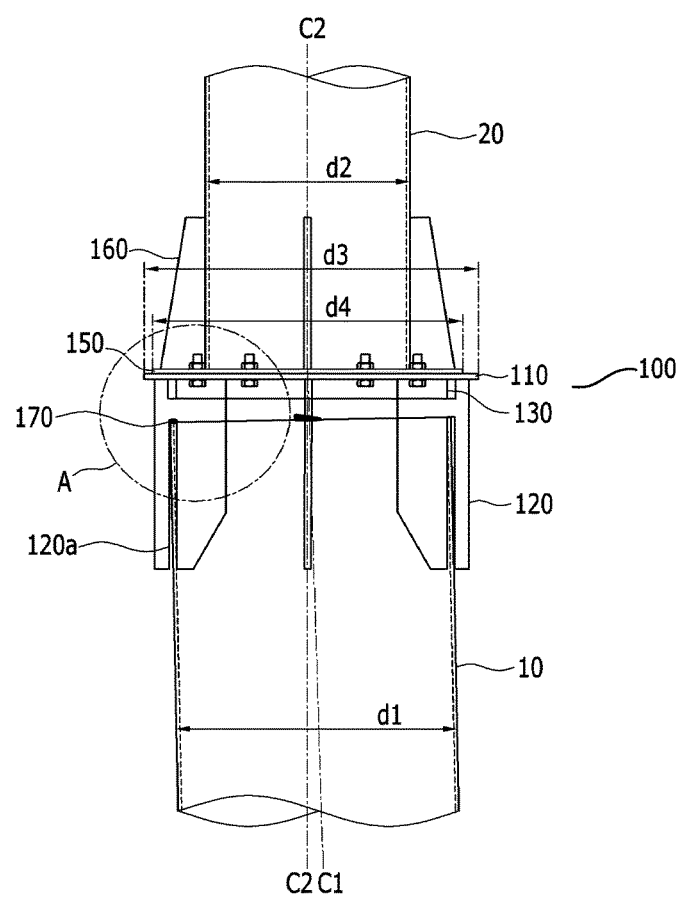
FIG. 1 is a side view illustrating a state in which a steel pipe pile and a steel pipe column are connected using a steel pipe socket according to an exemplary embodiment of the present invention.

Hereinafter, various exemplary embodiments of the present invention will be described in detail with reference to the accompanying drawings so that those skilled in the technical field to which the present invention pertains may easily carry out the exemplary embodiments. The present invention may be implemented in various different forms, and is not limited to the exemplary embodiments described herein.

Parts that are irrelevant to the description will be omitted to clearly describe the present invention, and the same or similar constituent elements will be designated by the same reference numerals throughout the specification.

Now, a steel pipe socket according to an exemplary embodiment of the present invention will be described in detail with reference to FIGS. 1 to 3.

Figure 2:
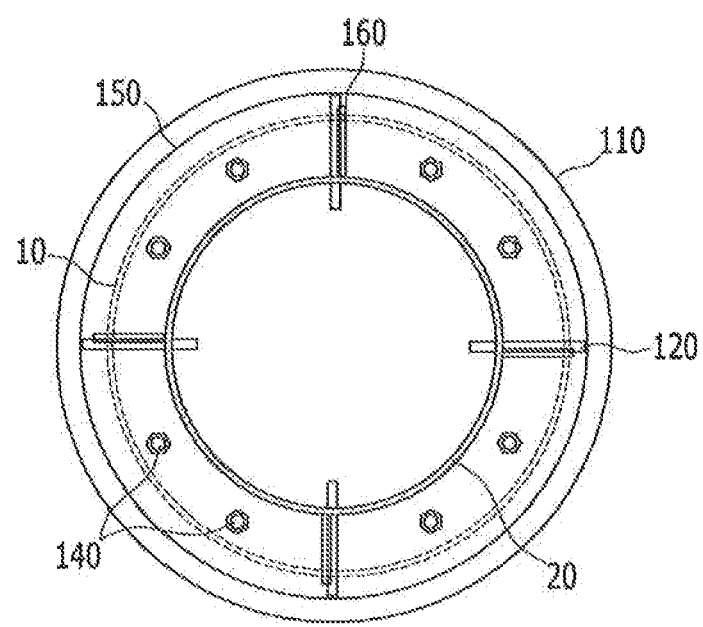
FIG. 2 is a top plan view illustrating a state in which the steel pipe pile and the steel pipe column are connected using the steel pipe socket according to the exemplary embodiment of the present invention.
Figure 3:
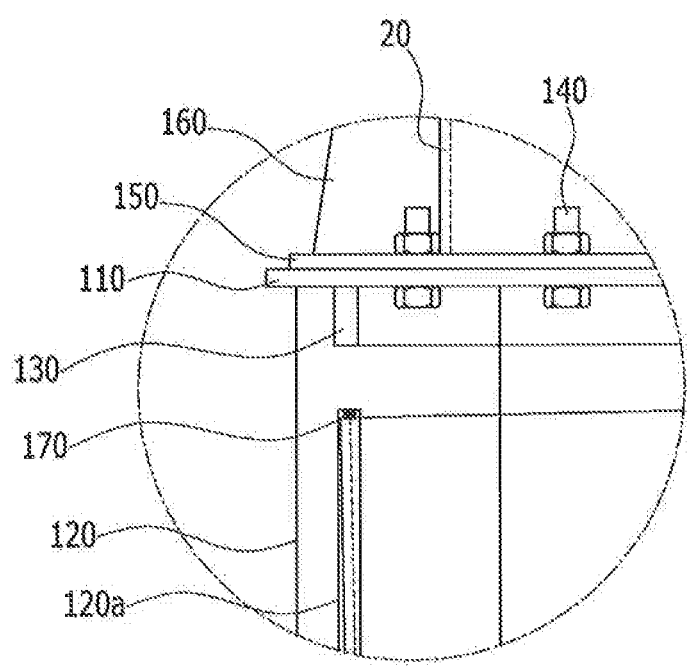
FIG. 3 is an enlarged view of part A of FIG. 1.

FIG. 1 is a side view illustrating a state in which a steel pipe pile and a steel pipe column are connected using a steel pipe socket according to an exemplary embodiment of the present invention, FIG. 2 is a top plan view illustrating a state in which the steel pipe pile and the steel pipe column are connected using the steel pipe socket according to the exemplary embodiment of the present invention, and FIG. 3 is an enlarged view of part A of FIG. 1.

As illustrated in FIGS. 1 to 3, a steel pipe socket 100 according an exemplary embodiment of the present invention is used to connect a steel pipe pile 10 and a steel pipe column 20 that have different diameters, and includes a socket supporting portion 110 which covers an upper end surface of the steel pipe pile 10, a plurality of socket insertion portions 120 which are extended downward from the socket supporting portion 110, and a plurality of fastening members 140 which are installed in the socket supporting portion 110.

Further, the steel pipe socket 100 includes socket connecting portions 150 and 160 which are installed on the steel pipe column 20 separately from the socket supporting portion 110. When the steel pipe pile 10 and the steel pipe column 20 are connected using the steel pipe socket 100, the socket connecting portions 150 and 160 connect the socket supporting portion 110 of the steel pipe socket 100 with the steel pipe column 20.

The steel pipe pile 10 may be installed at an installation position in a state in which a central axis C1 thereof is inclined due to an installation error. That is, the central axis C1 of the steel pipe pile 10 and a central axis C2 of the steel pipe column 20 may not be parallel with each other.

The socket supporting portion 110 is a circular plate, and a diameter d3 of the socket supporting portion 110 may be greater than a diameter d1 of the steel pipe pile 10. The socket supporting portion 110 serves to uniformly transmit a load of the steel pipe column 20 to the steel pipe pile 10.

The socket insertion portions 120 are vertically extended downward from the socket supporting portion 110, and have a plurality of socket grooves 120a at lower end portions thereof. The socket groove 120a of the socket insertion portion 120 is formed to be elongated in a direction parallel with the central axis C2 of the steel pipe column 20 to be connected.

Figure 5:
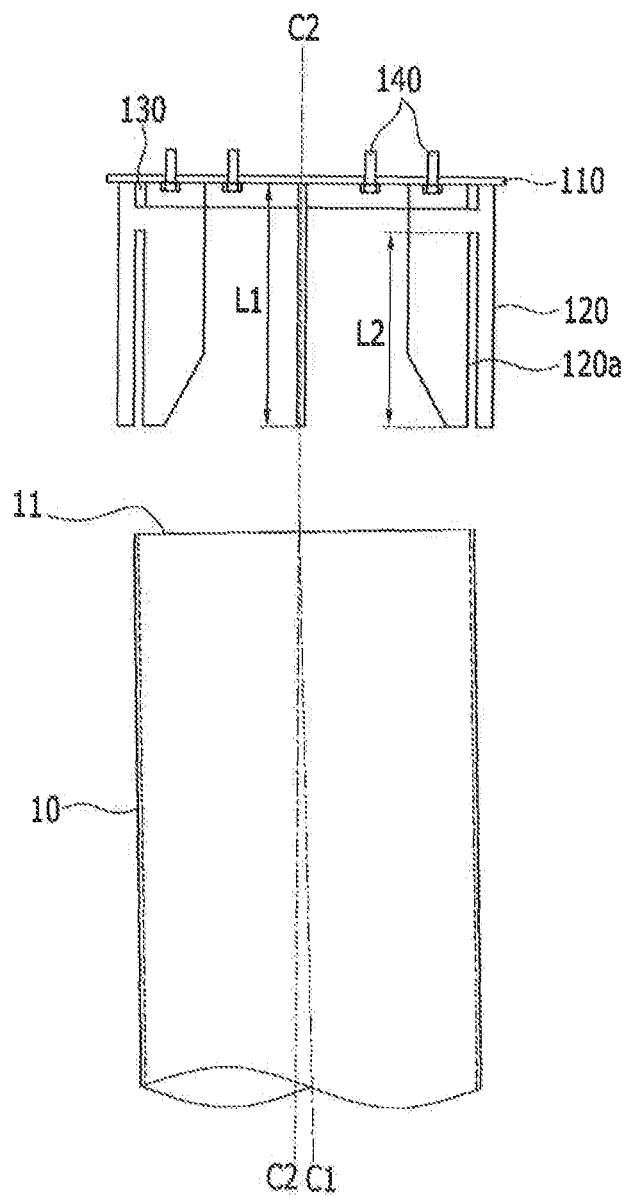

A length L1 of the socket insertion portion 120 may be greater than a length L2 of the socket groove 120a (see FIG. 5). An upper end portion of the steel pipe pile 10 is inserted into the socket groove 10a of the socket insertion portion 120.

The fastening member 140 fastens the steel pipe column 20 mounted on the socket supporting portion 110 to the socket supporting portion 110. The fastening members 140 are high tensile bolts and nuts which are disposed along an outer peripheral portion of the socket supporting portion 110, and have tensile strength of 50 kg/mm$^2$ or more. The fastening member 140 is installed by welding at a position that corresponds to a fastening hole 150a of the column supporting portion 150. At the time of a process of connecting the steel pipe pile 10 and the steel pipe column 20, the fastening members 140 are inserted into the fastening holes 150a (see FIG. 7) of the column supporting portion 150 so as to fasten the socket supporting portion 110, which is connected to the steel pipe pile 10, to the column supporting portion 150 which is connected to the steel pipe column 20.

The socket connecting portions 150 and 160 include a column supporting portion 150 which is installed on a lower end surface of the steel pipe column 20, and a plurality of reinforcing ribs 160 which are installed on the column supporting portion 150 and a side portion of the steel pipe column 20.

A diameter d4 of the column supporting portion 150 is greater than a diameter d2 of the steel pipe column 20, and is smaller than the diameter d3 of the socket supporting portion 110. At the time of the process of connecting the steel pipe pile 10 and the steel pipe column 20, all surfaces of the column supporting portion 150 come into contact with an upper surface of the socket supporting portion 110, such that the column supporting portion 150 serves to uniformly transmit a load of the steel pipe column 20 to the socket supporting portion 110.

The reinforcing ribs 160 are simultaneously in contact with the column supporting portion 150 and the side portion of the steel pipe column 20, and thus reinforce strength of a lower end portion of the steel pipe column 20.

Meanwhile, a reinforcing member 130, which reinforces strength and rigidity of the socket supporting portion 110, may be installed on a lower surface of the socket supporting portion 110. The reinforcing member 130 may have a ring shape that is formed along an outer peripheral portion of the socket supporting portion 110.

A horizontality maintaining member 170 is inserted into a gap between the steel pipe pile 10 and a bottom of the socket groove 120a of the socket insertion portion 120 so as to adjust horizontality of the socket supporting portion 110. The horizontality maintaining member 170 may have a wedge shape having an inclined end portion, and a height of the upper surface of the socket insertion portion 120 may be adjusted by inserting the horizontality maintaining member 170 into the gap between the steel pipe pile 10 and the bottom of the socket groove 120a of the socket insertion portion 120 to a large or small extent. Therefore, the socket supporting portion 110, which is connected to the upper surface of the socket insertion portion 120, may be adjusted to be horizontal, and as a result, verticality of the steel pipe column 20 mounted on the socket supporting portion 110 may be ensured.

Therefore, the steel pipe socket according to the exemplary embodiment of the present invention may allow work for connecting the steel pipe pile 10 and the steel pipe column 20 to be simply performed without pouring concrete to form a concrete bottom plate.

Hereinafter, a method of connecting the steel pipe pile and the steel pipe column using the steel pipe socket according to the exemplary embodiment of the present invention will be described in detail with reference to FIGS. 4 to 8.

FIGS. 4 to 8 are views sequentially illustrating a method of connecting the steel pipe pile and the steel pipe column using the steel pipe socket according to the exemplary embodiment of the present invention.

Figure 4:
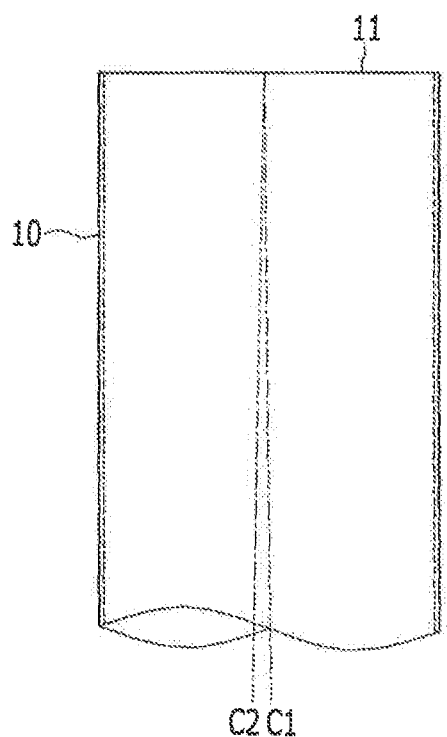
FIGS. 4 to 8 are views sequentially illustrating a method of connecting the steel pipe pile and the steel pipe column using the steel pipe socket according to the exemplary embodiment of the present invention.

As illustrated in FIG. 4, according to the method of connecting the steel pipe pile and the steel pipe column according to the exemplary embodiment of the present invention, the upper end portion of the steel pipe pile 10, which is installed in a construction site, is first cut, and then an upper end surface 11 of the steel pipe pile 10 is trimmed. The steel pipe pile 10 may be installed at an installation position in a state in which the central axis C1 thereof is inclined due to an installation error, and in the present exemplary embodiment, for convenience of description, a description will be made on the basis of a state in which the central axis C1 of the steel pipe pile 10 and the central axis C2 of the steel pipe column 20 are not parallel with each other.

Next, as illustrated in FIG. 5, the steel pipe socket 100 including the socket supporting portion 110, the plurality of socket insertion portions 120 which are extended downward from the socket supporting portion 110, and the plurality of fastening members 140 which are installed on the socket supporting portion 110, is prepared.

The socket groove 120a is formed in each of the socket insertion portions 120. In the present exemplary embodiment, four socket grooves 120a are formed in four socket insertion portions 120, but the present invention is not limited thereto. The socket groove 120a of the socket insertion portion 120 is formed to be elongated in a direction perpendicular to the horizontal upper surface of the socket supporting portion 110. That is, the socket groove 120a of the socket insertion portion 120 is formed to be elongated in a direction parallel with the central axis C2 of the steel pipe column 20 to be connected.

The reinforcing member 130, which reinforces strength and rigidity of the socket supporting portion 110, may be installed on the lower surface of the socket supporting portion 110 of the steel pipe socket 100.

Figure 6:
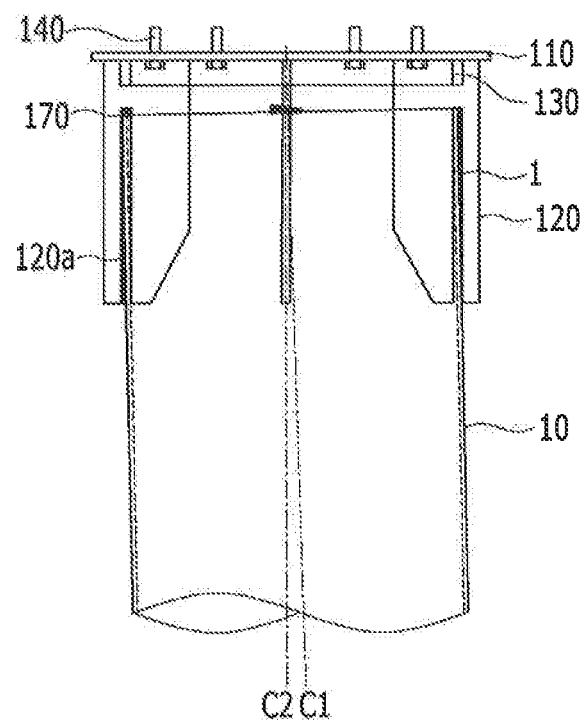

Next, as illustrated in FIG. 6, the upper end portion of the steel pipe pile 10 is inserted into the socket groove 120a of the socket insertion portion 120 of the steel pipe socket 100, and the socket supporting portion 110 of the steel pipe socket 100 is mounted on the upper end surface of the steel pipe pile 10. In this case, the steel pipe pile 10 is maximally inserted to the bottom of the socket groove 120a of the socket insertion portion 120. In this case, in a case in which the steel pipe pile 10 is inclinedly installed, the steel pipe pile 10 may not be inserted to the bottoms of some socket grooves 120a, and in this case, the socket supporting portion 110 connected to the socket insertion portion 120 may not be horizontally disposed.

In order to prevent the aforementioned problem, the horizontality maintaining member 170 is inserted into the gap between the steel pipe pile 10 and the bottom of the socket groove 120a of the socket insertion portion 120. The height of the upper surface of the socket insertion portion 120 may be adjusted by inserting the horizontality maintaining member 170 into the gap between the steel pipe pile 10 and the bottom of the socket groove 120a of the socket insertion portion 120 to a large or small extent. Therefore, the socket is supporting portion 110 which is connected to the upper surface of the socket insertion portion 120 may be adjusted to be horizontal, and as a result, verticality of the steel pipe column 20 mounted on the socket supporting portion 110 may be ensured.

Further, the socket insertion portion 120 is fixed to the steel pipe pile 10 by welding after confirming horizontality of the socket supporting portion 110. Therefore, a welding portion 1 is formed on a contact surface between the socket groove 120a of the socket insertion portion 120 and the steel pipe pile 10. After the steel pipe pile 10 is fixed to the socket groove 120a of the socket insertion portion 120 by welding, the horizontality maintaining member 170 may be removed.

Figure 7:
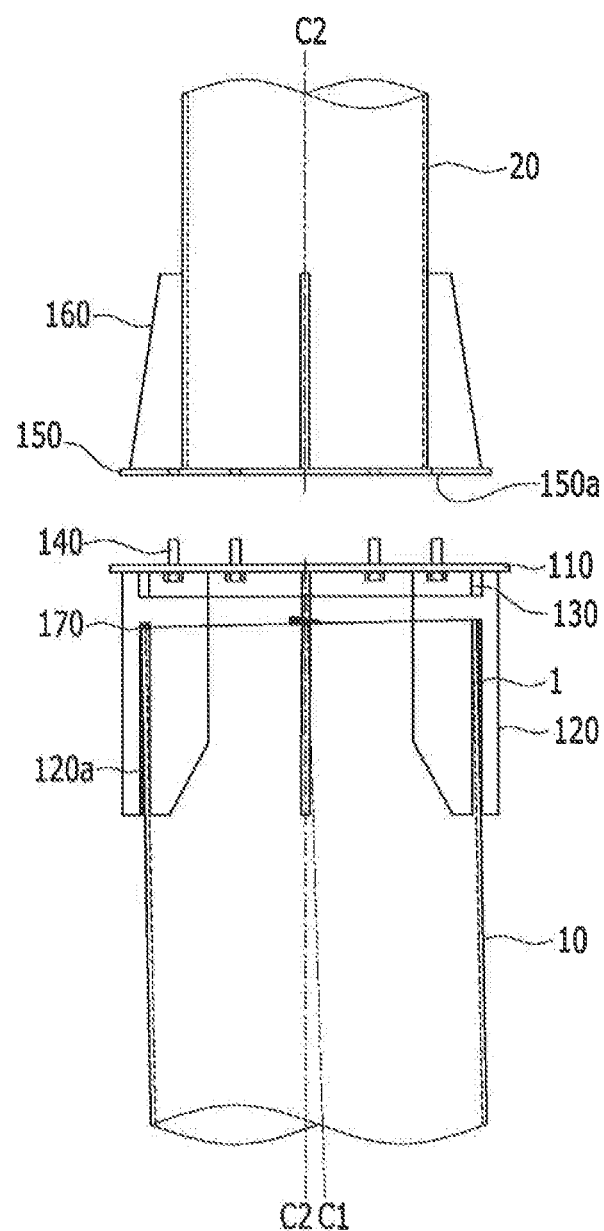

Next, as illustrated in FIG. 7, the socket connecting portions 150 and 160, which connect the socket supporting portion 110 of the steel pipe socket 100 and the steel pipe column 20, are installed on the steel pipe column 20. The socket connecting portions 150 and 160 include the column supporting portion 150 which is installed on the lower end surface of the steel pipe column 20, and the plurality of reinforcing ribs 160 which are installed on the column supporting portion 150 and the side portion of the steel pipe column 20.

Figure 8:
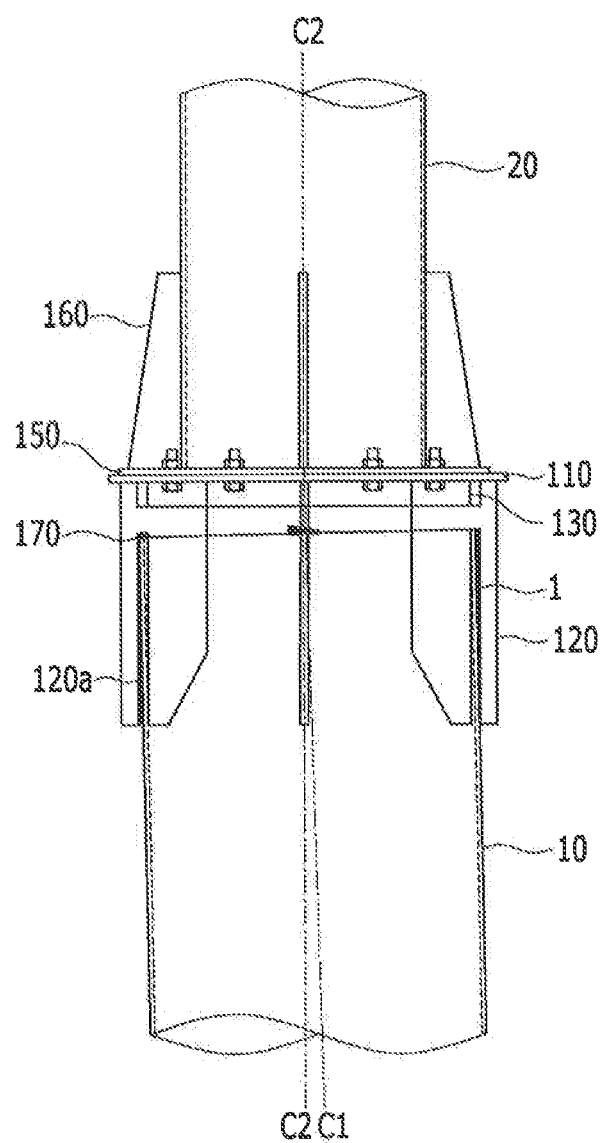

Next, as illustrated in FIG. 8, the steel pipe column 20 on which the socket connecting portions 150 and 160 are installed is mounted on the socket supporting portion 110 fixed to the steel pipe pile 10. In this case, the bottom surface of the column supporting portion 150 comes into contact with the upper surface of the socket supporting portion 110, and the plurality of fastening members 140 installed on the socket supporting portion 110 are inserted into the fastening holes 150a of the column supporting portion 150 so as to fasten the socket supporting portion 110, which is connected to the steel pipe pile 10, to the column supporting portion 150 which is connected to the steel pipe column 20.

In this case, a diameter of the fastening hole 150a of the column supporting portion 150 is greater than a diameter of the fastening member 140, thereby resolving a problem with deviation of horizontality of the steel pipe pile 10.

As described above, the method of connecting the steel pipe pile and the steel pipe column using the steel pipe socket according to the exemplary embodiment of the present invention may allow work for connecting the steel pipe pile 10 and the steel pipe column 20 to be simply performed without pouring concrete to form a concrete bottom plate.

In addition, it is possible to shorten a construction period that is required to connect the steel pipe pile 10 and the steel pipe column 20 in the construction site, and it is not necessary to construct the concrete bottom plate, thereby reducing required construction costs.

In addition, by installing the horizontality maintaining member 170, which is inserted into the gap between the steel pipe pile 10 and the bottom of the socket groove 120a of the socket insertion portion 120 and adjusts horizontality of the socket supporting portion 110, even in a case in which the steel pipe pile 10 is inclined when the steel pipe pile 10 is installed in the construction site, it is possible to remove eccentricity in a horizontal direction of the steel pipe pile 10 or the steel pipe column 20, and ensure verticality of the steel pipe column 20 mounted on the steel pipe pile 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A steel pipe comprising:
   a steel pipe pile and a steel pipe column that are not parallel to each other; and
   a steel pipe socket for connecting the steel pipe pile and the steel pipe column, the steel pipe socket comprising:
      a socket supporting portion covering an upper end surface of the steel pipe pile;
      a plurality of socket insertion portions extended downward from the socket supporting portion, wherein:
         each of the plurality of socket insertion portions includes a socket groove at a lower end of that socket insertion portion, and each socket groove being elongated in a direction parallel to and aligned with a central axis of the steel pipe column; and
         the plurality of socket insertion portions connect the socket supporting portion and the steel pipe pile by insertion of the steel pipe pile into the plurality of socket grooves; and
      a plurality of fastening members connecting the steel pipe column to the socket supporting portion, wherein the plurality of fastening members are installed on the socket supporting portion.

2. The steel pipe of claim 1, wherein the steel pipe socket further comprises:
   a horizontality maintaining member inserted into a gap between the steel pipe pile and a bottom of at least one of the socket grooves to maintain horizontality of the socket supporting portion.

3. The steel pipe of claim 2, wherein:
   the horizontality maintaining member has a wedge shape.

4. The steel pipe of claim 1, wherein the steel pipe socket further comprises:
   a reinforcing member installed on a lower surface of the socket supporting portion to reinforce strength of the socket supporting portion.

5. The steel pipe of claim 1, wherein the steel pipe socket further comprises:
   a socket connecting portion including a column supporting portion installed on a lower end surface of the steel pipe column; and
   a plurality of reinforcing ribs in contact with the column supporting portion and a side portion of the steel pipe column.

6. The steel pipe of claim 5, wherein:
   the column supporting portion is in contact with an upper surface of the socket supporting portion.

7. The steel pipe of claim 5, wherein:
   the plurality of fastening members include bolts and nuts that are disposed along an outer peripheral portion of the socket supporting portion; and
   the plurality of fastening members are inserted into fastening holes of the column supporting portion.

8. The steel pipe of claim 1, wherein:
   a diameter of the socket supporting portion is greater than a diameter of the steel pipe pile.

9. A method of connecting a steel pipe pile and a steel pipe column using a steel pipe socket, such that the steel pipe pile and the steel pipe column are not parallel to each other, the method comprising:
   preparing the steel pipe socket including:
      a socket supporting portion covering an upper end surface of the steel pipe pile;
      a plurality of socket insertion portions extended downward from the socket supporting portion, wherein each of the plurality of socket insertion portions includes a socket groove at a lower end of that socket insertion portion, each socket groove being elongated in a direction parallel to and aligned with a central axis of the steel pipe column; and a plurality of fastening members which are installed on the socket supporting portion;

inserting an upper end portion of the steel pipe pile into the socket grooves of the steel pipe socket;

mounting the steel pipe column on the socket supporting portion; and connecting the steel pipe column and the steel pipe pile by fastening the plurality of fastening members of the socket supporting portion.

10. The method of claim 9, further comprising:

maintaining horizontality of the socket supporting portion by inserting a horizontality maintaining member into a gap between the steel pipe pile and a bottom of at least one of the socket grooves.

11. The method of claim 9, further comprising:
fixing the steel pipe socket to the steel pipe pile by welding the steel pipe pile and the socket grooves.

12. The method of claim 9, further comprising:
installing a socket connecting portion on the steel pipe column to connect the steel pipe column with the steel pipe socket.

13. The method of claim 12, wherein installing the socket connecting portion includes:
installing a column supporting portion on a lower end surface of the steel pipe column; and
installing a plurality of reinforcing ribs in contact with the column supporting portion and a side portion of the steel pipe column.

14. The method of claim 13, further comprising:
inserting the fastening members into fastening holes of the column supporting portion.

* * * * *